United States Patent
Overzier et al.

(10) Patent No.: US 9,573,572 B2
(45) Date of Patent: Feb. 21, 2017

(54) BRAKE BOOSTER COUPLING DEVICE

(75) Inventors: Frank Overzier, Gaertringen (DE);
Jochen Mayer, Stuttgart-Botnang (DE);
Willi Nagel, Remseck/Hochdorf (DE);
Bernd Goetzelmann, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1340 days.

(21) Appl. No.: 13/048,923

(22) Filed: Mar. 16, 2011

(65) Prior Publication Data

US 2011/0248557 A1  Oct. 13, 2011

(30) Foreign Application Priority Data

Apr. 9, 2010  (DE) .................... 10 2010 003 822

(51) Int. Cl.
*B60T 13/74*  (2006.01)
*B60T 7/04*  (2006.01)
*B60T 1/10*  (2006.01)
*B60T 11/18*  (2006.01)
*B60T 13/575*  (2006.01)

(52) U.S. Cl.
CPC ................ *B60T 7/042* (2013.01); *B60T 1/10* (2013.01); *B60T 11/18* (2013.01); *B60T 13/575* (2013.01)

(58) Field of Classification Search
CPC ......... B60T 13/72; B60T 13/575; B60T 11/18
USPC ............................ 303/113.4, 114.3
See application file for complete search history.

(56) References Cited

U.S. PATENT DOCUMENTS

| | | | | |
|---|---|---|---|---|
| 4,482,192 A | * | 11/1984 | Leiber | 303/114.1 |
| 4,653,813 A | * | 3/1987 | Burgdorf | 303/50 |
| 4,826,255 A | * | 5/1989 | Volz | 303/10 |
| 5,943,937 A | * | 8/1999 | Endo | 91/369.2 |
| 6,079,208 A | | 6/2000 | Verbo et al. | |
| 2004/0069582 A1 | * | 4/2004 | Bacardit et al. | 188/356 |

FOREIGN PATENT DOCUMENTS

CN  1484592  3/2004
DE  197 22 739  12/1997

* cited by examiner

*Primary Examiner* — Xuan Lan Nguyen
(74) *Attorney, Agent, or Firm* — Norton Rose Fulbright US LLP

(57) ABSTRACT

A brake booster coupling device includes: a braking piston, an input piston displaceable by an operation of a brake input element from its starting position by a driver braking distance, a force transmission between the input piston displaced by a driver braking distance below a predefined threshold value and the braking piston is suppressed, and a booster piston displaceable with the aid of the brake booster drive such that the braking piston, which contacts the booster piston, is displaceable with the aid of the brake booster drive from a non-braking position into a braking position; a contact element displaceable by a displacement of the braking piston from the non-braking position into the braking position such that a first contact surface of the contact element contacts a second contact surface of the input piston in such a way that a driver brake force is transmittable to the braking piston.

19 Claims, 16 Drawing Sheets

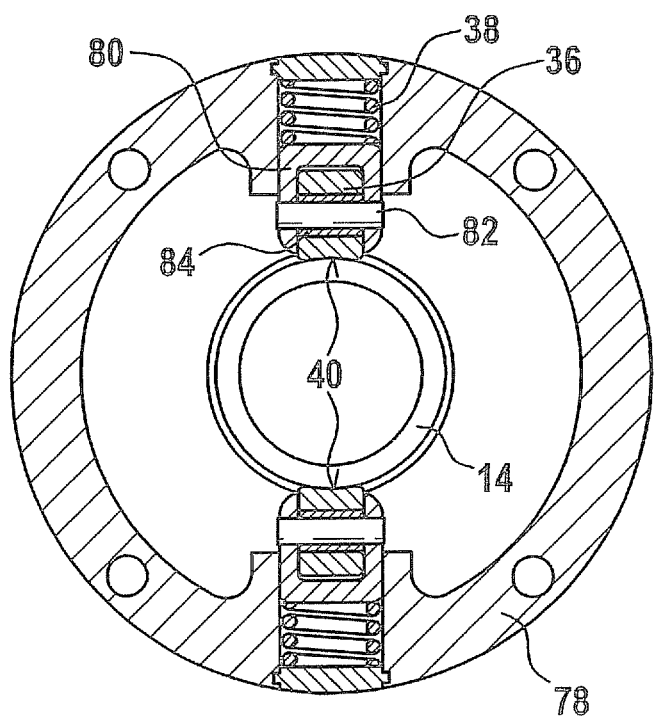

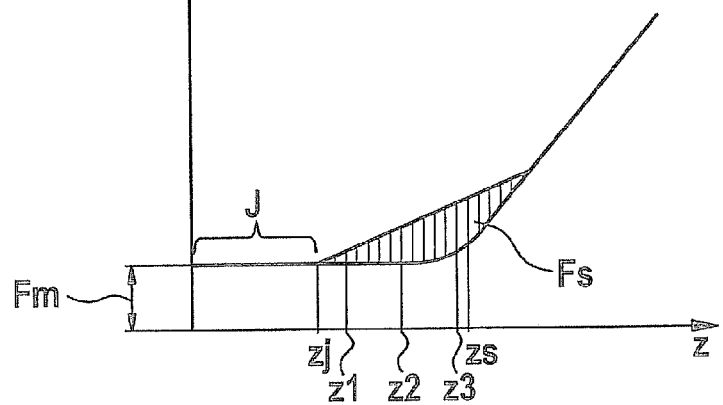
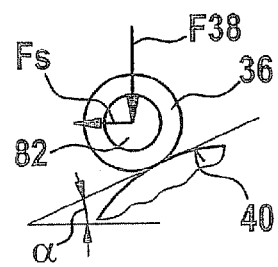
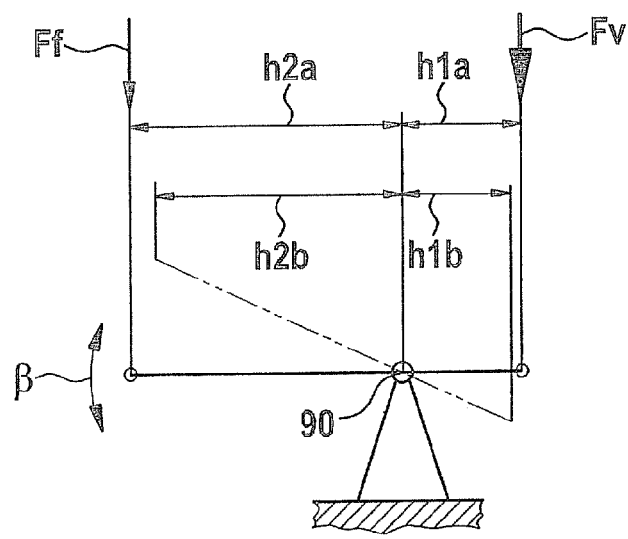

BRAKE BOOSTER COUPLING DEVICE

RELATED APPLICATION INFORMATION

The present application claims priority to and the benefit of German patent application no. 10 2010 003 822.9, which was filed in Germany on Apr. 9, 2010, the disclosure of which is incorporated herein by reference.

FIELD OF THE INVENTION

The present invention relates to a brake booster coupling device.

BACKGROUND INFORMATION

A conventional brake system for a vehicle frequently has a nonlinear relationship between a driver brake force, which a driver exerts on a brake input element of the brake system, and a braking force, which is applied to a braking component situated on a brake master cylinder. In particular, such a brake system, such as the servobrake device discussed in DE 197 22 739 C2, for example, often has a jump-in range which is perceptible to the driver during the operation of the brake input element.

FIGS. 1A and 1B show two coordinate systems to illustrate an example of a relationship between a driver brake force and a resulting braking force. The abscissas of the coordinate systems show a driver brake distance z, by which an input piston, which is coupled to the operated brake input element, is displaceable. The ordinate of the coordinate system of FIG. 1A shows driver brake force Ff to be applied to displace the input piston by driver brake distance z. In the coordinate system of FIG. 1B, the ordinate specifies resulting braking force Fe.

As is apparent in FIG. 1A, the driver must apply a minimum force Fm to move the input piston, which is in its starting position (z=0) when the brake input element is not operated, out of this position. During subsequent jump-in range J from the starting position up to a driver brake distance zj, driver brake force Ff to be applied to displace the input piston is comparatively low and nearly constant. In jump-in range J, braking force Fe only increases with a small slope. From driver brake distance zj, driver brake force Ff and braking force Fe become increasingly steeper and subsequently merge into an approximately linear range.

Jump-in range J often results from an air gap between the input piston, which is present in its starting position, and a disc (reaction disc), via which the driver brake force is transmittable from the input piston to a braking piston situated on the brake master cylinder after a displacement of the input piston by driver brake distance zj. Since in this case there is no contact for the force transmission between the input piston and the reaction disc in the event of a driver brake distance less than zj, braking force Fe is typically exerted on the braking piston by a brake booster drive in jump-in range J. The brake booster drive is typically activated in such a way that a booster piston, which is situated on the brake booster drive and contacts the disc, is synchronously moved with the input piston in such a way that a nonzero differential distance does not exist between the input piston and the booster piston.

SUMMARY OF THE INVENTION

The exemplary embodiments and/or exemplary methods of the present invention provide a brake booster coupling device for a vehicle having the features described herein.

The brake booster coupling device expands a brake system having a jump-in range by a blending functionality, so that during the braking, a part of the kinetic energy of the vehicle is convertible into electrical energy with the aid of a generator, without the driver noticing anything thereof because of a vehicle deceleration which deviates from standard behavior and/or because of an altered brake operation feeling. The exemplary embodiments and/or exemplary methods of the present invention therefore combine the advantages of automatic conversion of the kinetic energy of the vehicle into storable electrical energy with good operating comfort of the brake input element for the driver. It is ensured that in the various executable braking actions, which may include braking exclusively with the aid of the hydraulic friction brake, braking exclusively with the aid of the generator, and braking with simultaneous use of the hydraulic friction brake and the generator, a vehicle deceleration which is specified by the driver is reliably maintained, and a routine brake operation feeling is implemented for the driver in all braking actions. In particular, the implemented brake operation feeling corresponds to the standard brake feeling having a jump-in range.

Advantageous specific embodiments and refinements of the brake system according to the present invention are described herein.

Further features and advantages of the exemplary embodiments and/or exemplary methods of the present invention are explained in greater detail hereafter on the basis of the figures.

BRIEF DESCRIPTION OF THE DRAWINGS

FIG. 1A shows a coordinate system to illustrate an example of a relationship between a driver brake force and a corresponding braking force.

FIG. 1B shows another coordinate system to illustrate an example of a relationship between a driver brake force and a corresponding braking force.

FIGS. 2Aa, 2Ba, 2Ca, 2Da, 2Ea, 2Fa, 2Ga and 2Ha show schematic views of operating modes of a first specific embodiment of the brake booster coupling device, the coordinate systems of FIGS. 2Ab, 2Bb, 2Cb, 2Db, 2Eb, 2Fb, 2Gb and 2Hb show a relationship between a driver brake distance and a driver brake force, the coordinate systems of FIGS. 2Ac, 2Bc, 2Cc, 2Dc, 2Ec, 2Fc, 2Gc and 2Hc show a relationship between the driver brake distance and a braking force, and the coordinate systems of FIGS. 2Ad, 2Bd, 2Cd, 2Dd, 2Ed, 2Fd, 2Gd and 2Hd showing a relationship between the driver brake force and the braking force;

FIG. 3A shows a force flow in an operating mode of the brake system of FIG. 2.

FIG. 3B shows another force flow in an operating mode of the brake system of FIG. 2.

FIG. 3C shows another force flow in an operating mode of the brake system of FIG. 2.

FIGS. 4A, 4B, 4C, 4D and 4E show two cross sections, a coordinate system, and two schematic views to explain a second specific embodiment of the brake booster coupling device.

FIG. 5A shows a cross section to illustrate a third specific embodiment of the brake booster coupling device.

FIG. 5B shows another cross section to illustrate a third specific embodiment of the brake booster coupling device.

FIG. 6A shows a cross section to illustrate a fourth specific embodiment of the brake booster coupling device.

FIG. 6A shows another cross section to illustrate a fourth specific embodiment of the brake booster coupling device.

FIGS. 7a, 7b, 7c, and 7d show a schematic view and three coordinate systems to illustrate a fifth specific embodiment of the brake booster coupling device.

DETAILED DESCRIPTION

Figure 1A:
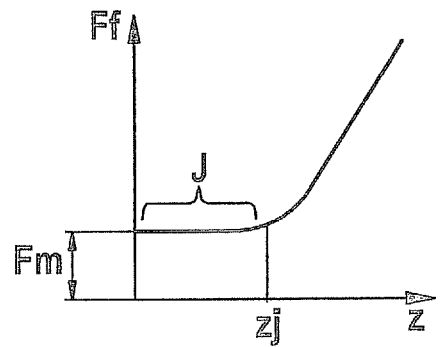
Figure 1B:
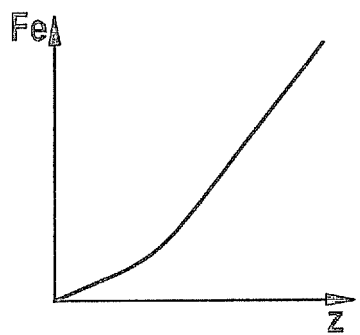
Figure 2A:
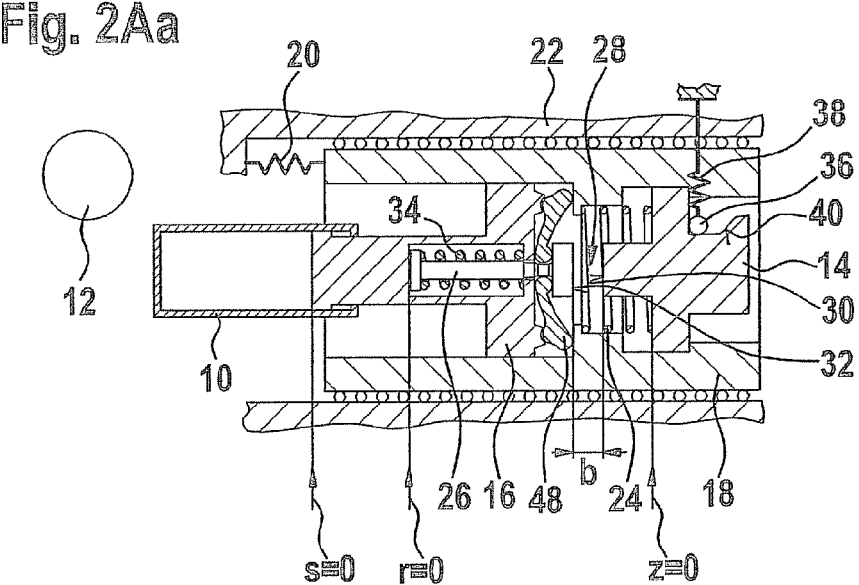
Figure 2A:
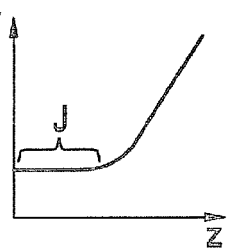
Figure 2A:
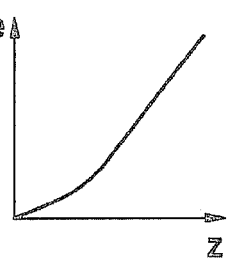
Figure 2A:
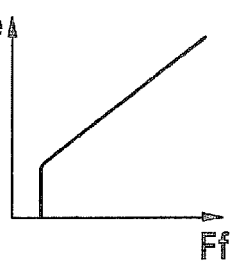

FIGS. 2Aa through 2Ha show schematic views of operating modes of a first specific embodiment of the brake booster coupling device, the coordinate systems of FIGS. 2Ab through 2Hb showing a relationship between a driver brake distance and a driver brake force, the coordinate systems of FIGS. 2Ac through 2Hc showing a relationship between the driver brake distance and a braking force, and the coordinate systems of FIGS. 2Ad through 2Hd showing a relationship between the driver brake force and the braking force. The abscissa of the coordinate systems of FIGS. 2Ab through 2Hb and FIGS. 2Ac through 2Hc is driver brake distance z. The ordinate of the coordinate systems of FIGS. 2Ab through 2Hb and the abscissa of the coordinate systems of FIGS. 2Ad through 2Hd is driver brake force Ff. Correspondingly, the ordinate of the coordinate systems of FIGS. 2Ac through 2Hc and FIGS. 2Ad through 2Hd is braking force Fe.

The brake booster coupling device which is schematically shown in FIGS. 2Aa through 2Ha is coupled to a brake master cylinder 10 having at least one hydraulic brake circuit (not shown). For example, brake master cylinder 10 may be a tandem brake master cylinder. As described in greater detail hereafter, an inner volume of brake master cylinder 10 is changeable in such a way that a desired internal pressure is settable in brake master cylinder 10 and in at least one wheel brake cylinder of the hydraulically connected brake circuit. In this way, a desired hydraulic braking torque may be exerted on at least one assigned wheel with the aid of the at least one wheel brake cylinder.

The at least one brake circuit which cooperates with brake master cylinder 10 may be assigned, for example, to exclusively one wheel, the wheels of one axle of the vehicle, at least two wheels situated on one side of the vehicle, or two wheels situated diagonally on the vehicle. The brake booster coupling device described hereafter is not restricted to a specific embodiment of the brake circuits which cooperate with brake master cylinder 10.

The brake booster coupling device is advantageous in particular in the case of an arrangement in a (regenerative) brake system having a generator 12, with the aid of which a generator braking torque is exertable on at least one wheel. All known specific embodiments of a generator for converting a kinetic energy of a vehicle into storable electrical energy are usable together with the brake booster coupling device. A more precise description of usable generator 12 will therefore be dispensed with here.

The (regenerative) brake system which is equipped with the brake booster coupling device has at least one brake input element (not shown), such as a brake pedal. An input piston 14 of the brake booster coupling device may be coupled to the brake input element in such a way that input piston 14 is displaceable by a driver brake distance z in relation to brake master cylinder 10 in the event of an operation of the brake input element by the driver of the vehicle. Input piston 14 may be designed as an input rod or include an input rod, for example. However, it is to be noted that input piston 14 is not restricted to an approximately rod-shaped form. Instead, input piston 14 may be understood as a force transmission component of arbitrary form, which is displaceable in the direction toward brake master cylinder 10 in the event of an operation of the brake input element by the driver.

A braking piston 16 of the brake booster coupling device may be displaceably situated/coupled onto brake master cylinder 10. Braking piston 16, which is coupled to brake master cylinder 10, may be at least partially pushed into brake master cylinder 10 with an exertion of force. Therefore, an internal pressure in brake master cylinder 10 is settable according to the desired hydraulic braking torque with the aid of braking piston 16.

Braking piston 16 may be understood as an output rod, for example. The (regenerative) brake system described here is not restricted to an approximately rod-shaped braking piston 16, however. Instead, braking piston 16 may be understood as any displaceable braking component of a brake master cylinder 10, with the aid of which a desired internal pressure is implementable in brake master cylinder 10.

In order to allow a driver of a vehicle which is equipped with the brake system described here to have good operating comfort of the brake operation element in the event of a braking action, the brake system also has a brake booster drive (not shown). The brake booster drive may include at least one electric motor. The advantages listed hereafter are not restricted to equipping the brake system with an electromechanical brake booster, however. A vacuum brake booster may also be used as an alternative or supplement to an electromechanical brake booster. The brake booster drive may thus also be understood as a drive, which is not designed as an electric motor, for providing a booster force Fv.

The brake booster drive is connectable via a booster piston 18 of the brake booster coupling device to braking piston 16 in such a way that booster force Fv is transmittable via booster piston 18 to braking piston 16 to set a desired internal pressure in brake master cylinder 10. Booster piston 18 may be connected via at least one spring 20 to a surrounding housing 22. In this way, undesired displacement of booster piston 18 may be prevented during non-operation of the brake booster drive. Brake master cylinder 10 may also be connected to housing 22. Since the technology according to the present invention does not impair the arrangement of the brake master cylinder in a vehicle, it is not discussed in greater detail here.

Input piston 14 may be at least partially situated inside a cavity in booster piston 18. Braking piston 16 may also at least partially protrude into a cavity of booster piston 18. The brake booster coupling device described here is not restricted to such an arrangement of pistons 14, 16, 18 to one another, however.

Optionally, braking piston 16 may be connected via a spring unit, such as illustrated intermediate spring 24, to booster piston 18. In the implementation of the brake system described here, however, intermediate spring 24 or a corresponding spring unit between input piston 16 and booster piston 18 may also be dispensed with.

FIG. 2Aa shows a position of pistons 14, 16, and 18 in the case of non-operation of the brake input element. Since driver brake force Ff, which is exerted on brake input element, is equal to zero (see FIG. 2Ab), input piston 14 is present in its starting position (z=0), in which it is decoupled from braking piston 16. Decoupling of input piston 14 from braking piston 16 may be understood to mean that there is no direct contact of input piston 14 on braking piston 16 and no indirect connection, via a component which contacts braking piston 16, for a force transmission between pistons 14 and 16. In particular, input piston 14 is spaced apart in its starting position from a contact element 26, which is displaceably situated on braking piston 16. An air gap 28 exists between a first contact surface 32 of contact element 26, which is oriented toward input piston 14, and a second contact surface 30 of input piston 14, which is oriented toward contact element 26. A starting width b for air gap 28 is definable as the spacing between contact surfaces 30 and 32.

As explained in greater detail hereafter, the brake booster coupling device described here has the advantage that jump-in range J, which is perceptible to the driver during the operation of the brake input element, is predefinable differently from starting width b of air gap 28. In particular, a high executable degree of recuperation may be implemented via starting width b of air gap 28 and may be blended so it is not perceptible to the driver. Starting width b of air gap 28 may correspond to a maximum executable degree of recuperation, jump-in range J, which is perceived by the driver, simultaneously being impaired hardly or not at all by the particularly wide layout of air gap 28 having a high starting width b. The desired standard brake operation feeling during the operation of the brake input element, e.g., a pedal feeling, is therefore implementable having a what may be a jump-in range J in spite of a high executable and blendable degree of recuperation/generator braking torque.

Contact element 26 may be a tappet which is connected via a restoring spring 34 to braking piston 16, for example. In particular if the tappet is used as contact element 26, a brake booster coupling device with an air gap 28 having a large starting width b is implementable in a simple way. In this case, the tappet may protrude at least partially into a cavity of braking piston 16. Further features of the advantageous arrangement/coupling of contact element 26 on braking piston 16 and/or brake master cylinder 10 are explained in greater detail hereafter.

In the case of non-operation of the brake input element, force transmission also does not occur from the brake booster drive (not shown) to braking piston 16. The motor of the brake booster may be deactivated/turned off in this operating mode. Braking force Fe is therefore equal to zero (see FIG. 2Ac) and braking piston 16 is present in its non-braking position at a braking distance s=0.

A starting position in relation to braking piston 16 is also definable for a contact element 26, which is displaceable in relation to braking piston 16, having a relative displacement distance r between braking piston 16 and contact element 26 equal to zero. If contact element 26 is deformable in relation to braking piston 16, a relative distance of the first contact surface may accordingly also be definable in relation to braking piston 16.

The brake booster coupling device optionally also includes a pedal force partial simulator which is situated on input piston 14. The pedal force partial simulator which is schematically shown here includes at least one roller 36, which is pressed with the aid of a simulator spring 38 against input piston 14. A path 40 of the at least one roller 36 runs along input piston 14, which is shaped in such a way that simulator force Fs, which is exerted by roller 36 on input piston 14, is variable according to a desired pedal feeling. The at least one path 40 may be shaped in such a way that associated roller 36 has a minimum spacing to a central longitudinal axis of input piston 14 and/or a maximum spacing to surrounding housing 22 if input piston 14 is present in its starting position. Further sections of the at least one path will be discussed during the description of the following figures.

In order to displace input piston 14 out of its starting position (at z=0), the driver must exert a relatively low driver brake force Ff equal to a minimum force Fm on the brake operation element. Within jump-in range J from the starting position (at z=0) to a driver brake distance zj, the input piston is displaceable with the aid of a small and what may be (nearly) constant driver brake force Ff. For the driver, this is associated with the advantage that he does not have to execute a force-intensive movement to lightly brake his vehicle.

Figure 2B:
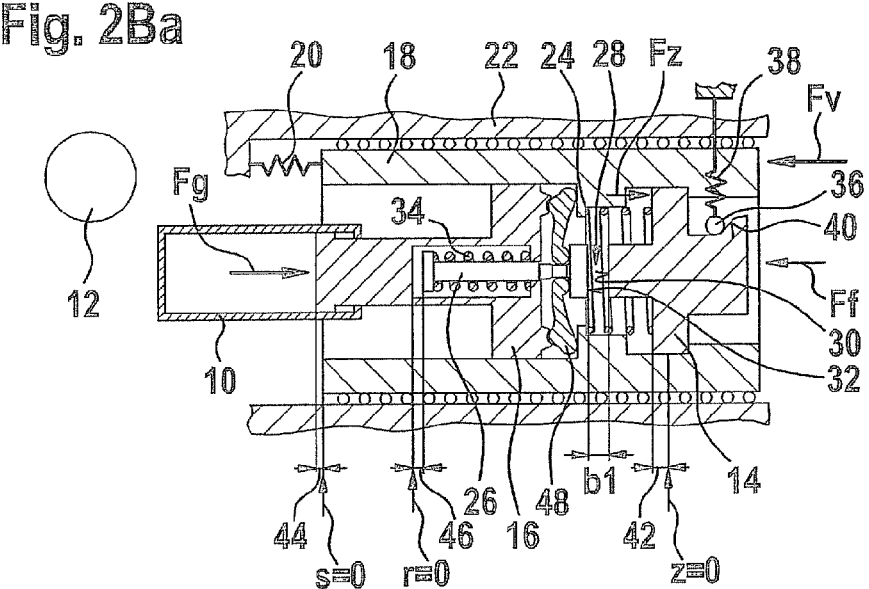
Figure 2B:
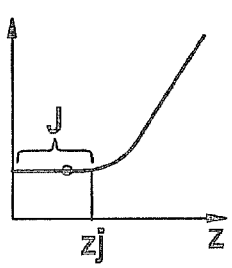
Figure 2B:
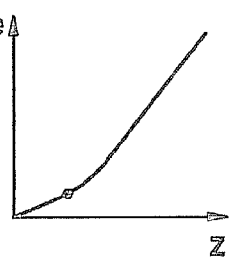
Figure 2B:
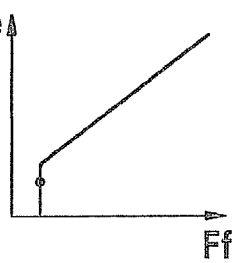

FIG. 2Ba shows a position of pistons 14 through 18 and contact element 26 to one another in the case of a driver brake distance z 42 within jump-in range J. In this operating mode of the brake booster coupling device, a force transmission from input piston 14 to braking piston 16 is prevented because of air gap 28 between contact surfaces 30 and 32, however. It is to be noted that in the case of a driver brake distance z within jump-in range J, there is no direct contact between pistons 14 and 16 for a force transmission. The driver therefore does not directly brake using driver brake force Ff transmitted to input piston 14 into brake master cylinder 10 in the case of a driver brake distance z within jump-in range J.

Optionally, the brake system which is equipped with the brake booster coupling device may already be controllable in the case of a driver brake distance z within jump-in range J in a braking mode exclusively having a hydraulic braking torque, in a braking mode exclusively having a generator braking torque, and/or in a braking mode having a hydraulic braking torque and a generator braking torque, as described in greater detail hereafter. As an alternative thereto, the brake system may also be designed in such a way that in the case of a driver brake distance z within jump-in range J, only hydraulic braking is performed because of the comparatively low vehicle deceleration requested by the driver.

A braking action, which is executed without generator 12, is schematically shown in FIG. 2Ba. A booster force Fv is exerted on booster piston 18 with the aid of the brake booster drive. Control electronics may be configured for the purpose of activating the brake booster drive in such a way that provided booster force Fv corresponds to the braking command of the driver predefined with the aid of driver brake force Ff.

With the aid of booster force Fv, braking piston 16, which is coupled to booster piston 18, is displaced from its non-braking position (at s=0) by a braking distance 44 into at least one braking position in brake master cylinder 10. The internal pressure in brake master cylinder 10 is increased until a counter force Fg equal to braking force Fe acts on braking piston 16. The pressure increase in brake master cylinder 10 causes a corresponding hydraulic braking torque on the wheels assigned to the connected brake circuits.

Contact element 26, which is situated on braking piston 16, is displaceable and/or deformable during a displacement of braking piston 16 out of the non-braking position into at least one braking position (having a nonzero braking distance s 44) in such a way that first contact surface 32 of contact element 26 is transferable in relation to braking piston 16 in a direction toward second contact surface 30 of input piston 14. During a displacement of input piston 14 within jump-in range J, current width b1 of the air gap or the spacing between contact surfaces 30 and 32 is below starting width b in spite of the displacement of braking piston 16 in a direction oriented away from input piston 14.

For example, displaceable contact element 26 may be connected via a hydraulic feedback unit to brake master cylinder 10 for this purpose. Such a hydraulic feedback unit is implementable, for example, in that braking piston 16 is provided with a passage opening (not shown), via which a braking gas or braking fluid exchange is possible between the internal volume of brake master cylinder 10 and a surface of contact element 26. In this case, a pressure increase in the brake master cylinder also causes a displacement force (not shown), which displaces contact element 26 in relation to braking piston 16 from its starting position (at r=0) by a relative displacement distance 46.

In a particularly advantageous specific embodiment, the brake booster coupling device also includes a lever 48, via which contact element 26 is connected to booster piston 18. This ensures in a simple way a particularly advantageous maintenance of a linear displacement movement of contact element 26 in relation to braking piston 16 in the event of a pressure increase in brake master cylinder 10. However, the design of the coupling device is not restricted to equipment with such a lever 48.

The at least one path 40 of the pedal force partial simulator may be shaped in such a way that the at least one roller 36 moving along it does not execute a relative movement with respect to surrounding housing 22 during a displacement movement of input rod 14 within jump-in range J. This may also be described in such a way that in this case, the spacing between roller 36 and housing 22 is kept (nearly) constant, and roller 36 is therefore not displaced against the force of simulator spring 38. This causes, as explained in greater detail hereafter, a uniformly low friction between roller 36 and braking piston 14. During a displacement movement of the braking piston in jump-in range J, the pedal force partial simulator therefore does not cause any substantial simulator force Fs, which the driver must additionally exert as driver brake force Ff on the brake input element. Such a pedal force partial simulator therefore ensures a pleasant brake operation feeling for the driver, who must only exert a small driver brake force Ff on the brake input element for light braking of his vehicle within jump-in range J.

Figure 2C:
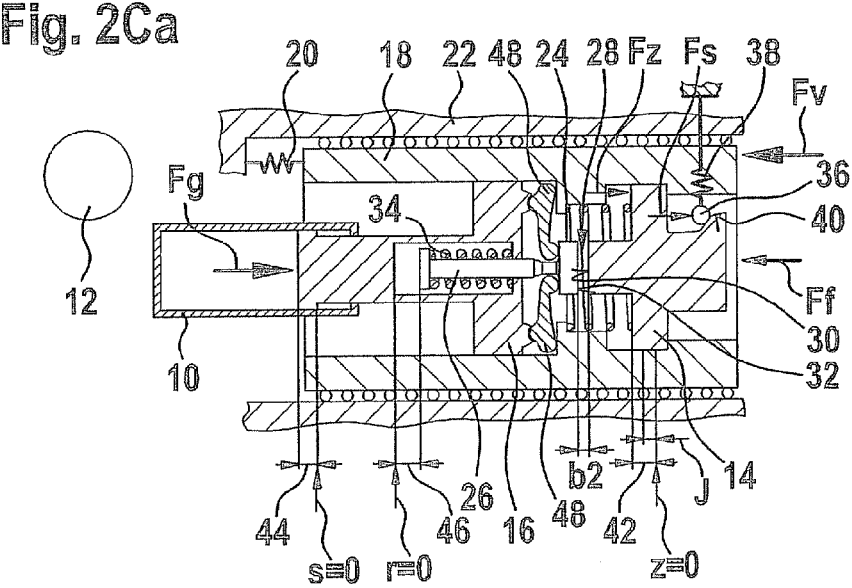
Figure 2C:
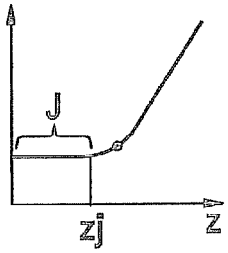
Figure 2C:
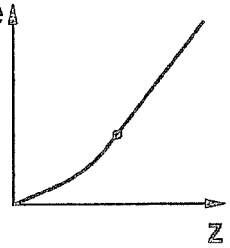
Figure 2C:
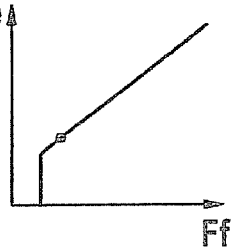

FIG. 2Ca shows a position of pistons 14 through 18 and contact element 26 to one another in the case of an operating mode in which the driver operates the brake operating element beyond jump-in range J, which is perceptible to him. The driver therefore perceives an increase of the force counteracting his brake operation from driver brake distance zj, after the displacement of input piston 14 beyond jump-in range J, which is perceptible to the driver. From driver brake distance zj, the driver must exert a driver brake force Ff, which is elevated in relation to jump-in range J, on the brake input element because of the increased counteracting force for a further displacement of input piston 14. The brake operation feeling which is perceptible by the driver therefore corresponds to a routine standard.

Nonetheless, after the displacement of input piston 14 beyond jump-in range J, air gap 28 still exists between contact surfaces 30 and 32. Even if current width b2 of air gap 28 or the spacing between contact surfaces 30 and 32 is below starting width b, a force transmission from input piston 14 to braking piston 16 via contact element 26 is nonetheless prevented.

In order that the driver perceives a standard brake operation feeling during the operation of the brake input element in spite of air gap 28 between contact surfaces 30 and 32 and is not irritated by an unusually large jump-in range J, the at least one path 40 is shaped in such a way that the at least one roller 36 traveling along it contacts a bulge after a displacement of input piston 14 beyond jump-in range J, or from the driver brake distance zj, and therefore is pressed into a closer spacing to housing 22 against the force of simulator spring 38 upon a further increase of driver brake distance z. As explained in greater detail hereafter, this causes an increase of simulator force Fs, which the driver perceives as an increase of driver brake force Ff to be applied by him. This ensures the standard brake operating feeling for the driver.

In this way, various possibilities are feasible for executing the vehicle deceleration desired by the driver even in the event of a stronger braking of the vehicle outside jump-in range J. The option is between braking of the vehicle by braking into the brake master cylinder with the aid of the brake booster, braking of the vehicle with the aid of a generator braking torque, or braking of the vehicle with the aid of a combination of direct braking into brake master cylinder 10 with the aid of the brake booster and a generator braking torque. The selection of the executed braking action may be carried out under consideration of a charge state of the internal-vehicle storage unit, such as the vehicle battery, and/or a current vehicle speed which is suitable for advantageous operation of generator 12. The blending procedures described in greater detail hereafter are simultaneously executable for blending of the generator braking torque which is unnoticeable by the driver.

The advantage of equipping the brake system described here with the brake booster coupling device is that the various possibilities for executing the vehicle deceleration are also executable in the case of stronger braking of the vehicle, without the driver perceiving which of the executable braking actions is applied as a result of a changed brake operation feeling. The driver is therefore not irritated by an unfamiliar brake operation feeling. This ensures good operating comfort of the brake input element with an advantageous option for recharging the storage unit as needed and/or under consideration of the current vehicle speed.

However, an operating mode is shown in FIG. 2Ca in which use of generator 12 for braking the vehicle is dispensed with, for example, because of a completely charged energy storage. Instead, a hydraulic braking torque which is adapted to the current operation of the brake pedal by the driver is set at the wheels via direct braking with the aid of booster force Fv via booster piston 18 and braking piston 16.

Figure 2D:
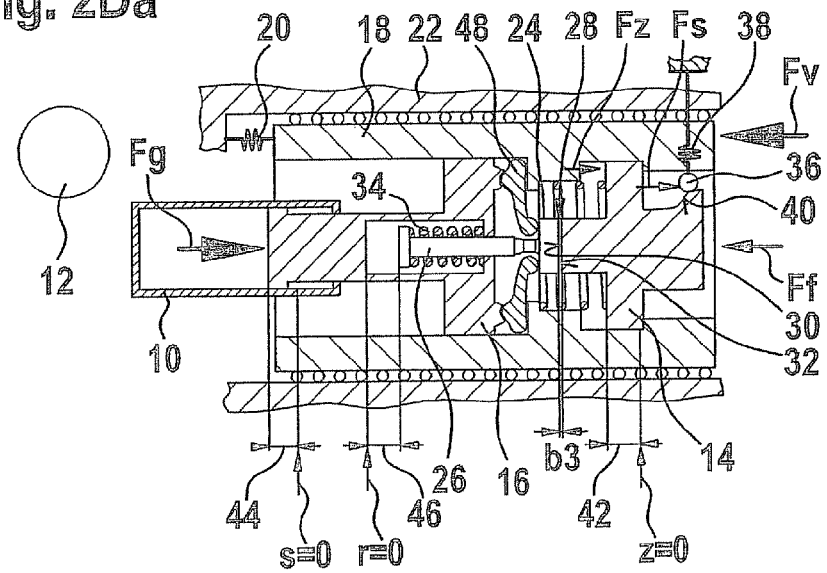
Figure 2D:
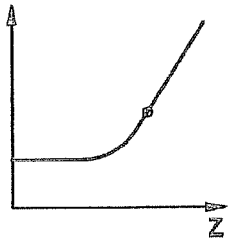
Figure 2D:
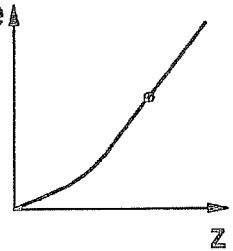
Figure 2D:
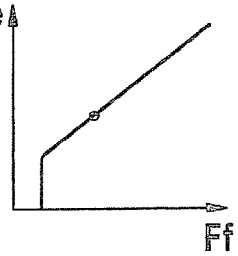
Figure 2E:
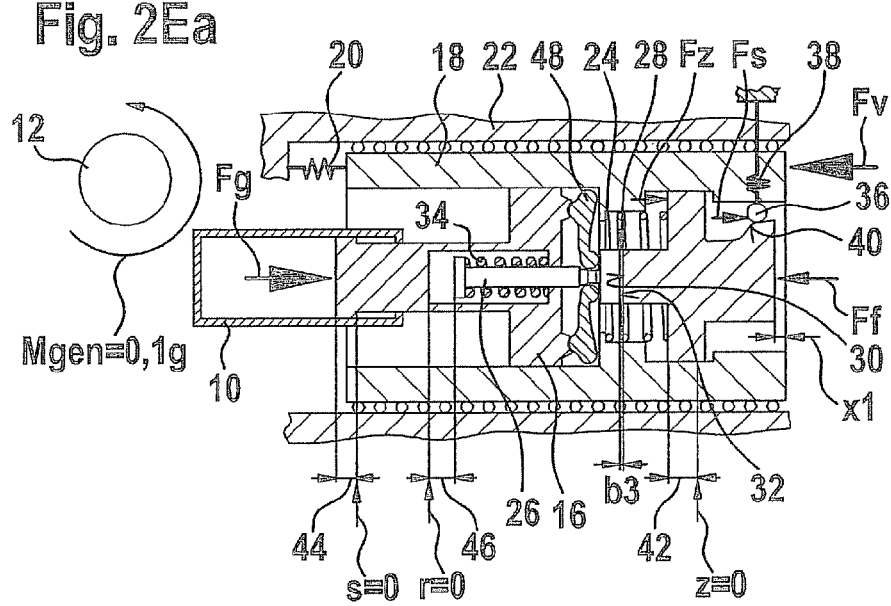
Figure 2E:
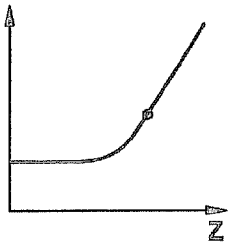
Figure 2E:
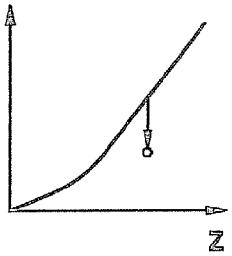
Figure 2E:
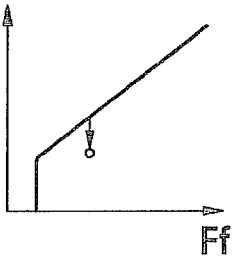
Figure 2F:
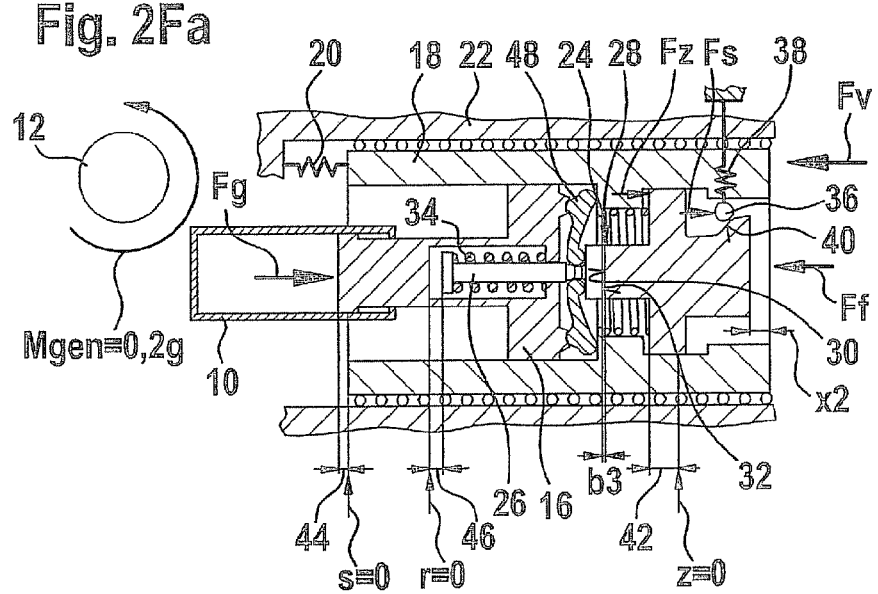
Figure 2F:
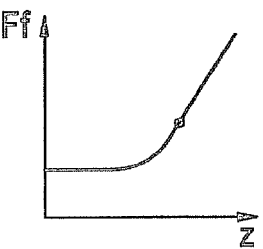
Figure 2F:
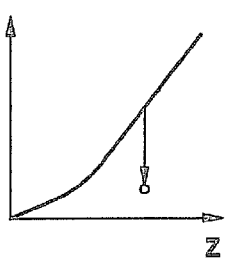
Figure 2F:
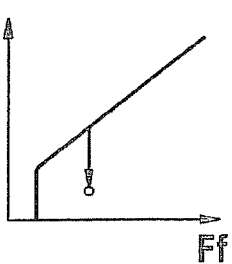
Figure 2G:
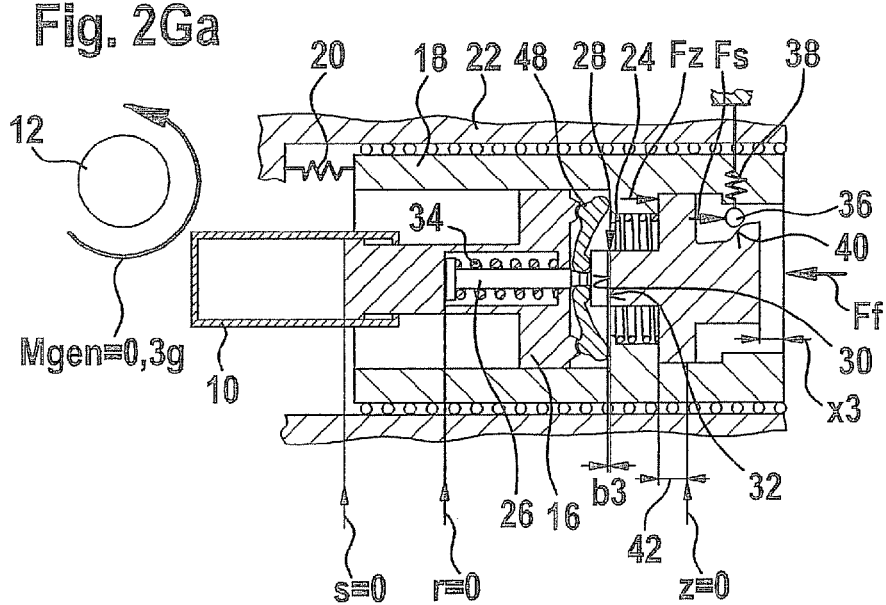
Figure 2G:
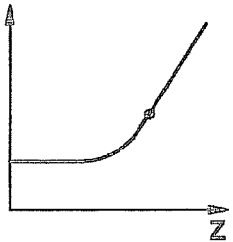
Figure 2G:
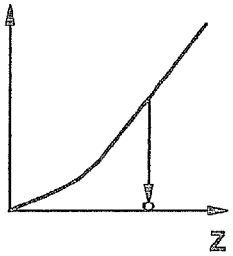
Figure 2G:
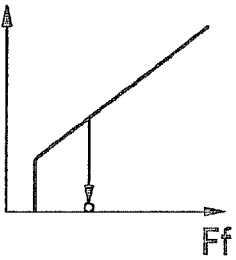

FIGS. 2Da through 2Ga show the advantages of an enlargement of a mechanical (actual) decoupling range by providing the brake booster coupling device with an air gap 28 having a comparatively large starting width b between components 14 and 26, which are present in their starting position, in relation to jump-in range J for the driver. It is apparent that the brake input element is also decoupled from brake master cylinder 10 after a displacement of input piston 14 beyond jump-in range J, or also in a driver braking distance range beyond driver braking distance zj, in such a way that the possibility of using generator 12 having a generator braking torque Mgen still exists, without the driver noticing feedback therefrom. In particular, generator braking torque Mgen may be varied, and may assume values of 0 g (FIG. 2Da), 0.1 g (FIG. 2Ea), 0.2 g (FIG. 2Fa), or 0.3 g (FIG. 2Ga), for example. The values listed here are to be understood as only exemplary. Of course, intermediate values between listed generator braking torques Mgen is also implementable.

In the brake system described here having the brake booster coupling device, a degree of recuperation of up to 100% is feasible. Such a degree of recuperation of 100% may be understood to mean that the brake booster drive remains passive (Fv=0), while generator 12 brakes at 100% (see FIG. 2Ga). The brake booster drive is therefore operable, at least in the case of a driver braking distance z of input piston 14 below predefined threshold value zs, in a non-recuperation mode having a degree of recuperation equal to zero and in at least one recuperation mode having a degree of recuperation not equal to zero.

As is clear on the basis of FIGS. 2Db through 2 Gb, the driver does not notice the different degrees of recuperation. Therefore, for example, a change may be made from a first degree of recuperation having a first generator braking torque Mgen to a second degree of recuperation having a different second generator braking torque, without the driver feeling feedback. This ensures an advantageous adaptation of the currently executed degree of recuperation to the charge state of the storage unit and/or to the current vehicle speed without irritation of the driver.

It is also recognizable on the basis of the described figures that in the case of a driver braking distance z within the mechanical (actual) decoupling range, which is enlarged in relation to jump-in range J perceptible to the driver, the presence of air gap 28 between input piston 14 and contact element 26 is independent of the degree of recuperation/generator braking torque Mgen, independent of a relative position/a relative distance x1, x2, and x3 of input piston 14 in relation to booster piston 18, and independent of a relative position of input piston 14 in relation to braking piston 16. Therefore, booster force Fv provided by the brake booster (not shown) may be varied without this resulting in undesired closing of air gap 28.

As may also be recognized on the basis of FIGS. 2Da through 2Ga, it is ensured in a specific embodiment of the advantageous design/coupling of contact element 26 in the case of a driver braking distance z within the mechanical (actual) decoupling range that also in the case of different degrees of recuperation, a width b3 of air gap 28, which is independent of the set degree of recuperation/generator braking torque Mgen, of a relative distance x1, x2, and x3 of booster piston 18 in relation to input piston 14, and/or of a relative distance of braking piston 16 in relation to braking piston 14, is provided as the spacing between contact surfaces 30 and 32. The brake booster coupling device may therefore be configured in such a way that in the case of a driver braking distance z within the mechanical (actual) decoupling range, a current width b1, b2, and/or b3 of air gap 28 is independent of the existing degree of recuperation, of a relative distance x1, x2, and x3 of booster piston 18 in relation to input piston 14, and/or of a relative distance of braking piston 16 in relation to input piston 14. This may also be paraphrased that, in the case of a driver braking distance z within the mechanical (actual) decoupling range, current width b1, b2, and/or b3 of the air gap is a function of driver braking distance z. A variation of the degree of recuperation therefore does not result in a change of current width b1, b2, and/or b3 of air gap 28.

It is noted once again here that in the brake system shown here having the brake booster coupling device, the brake booster drive need not be activated in such a way that a uniform relative position of input piston 14 in relation to booster piston 18 is always regulated. Instead, relative position/relative distance x1, x2, and x3 of input piston 14 may be intentionally varied in relation to booster piston 18 in such a way that a total braking torque desired by the driver, which is made up of a generator braking torque Mgen and/or a hydraulic braking torque, is present at the vehicle wheels. In particular, the lever ratio described in greater detail hereafter may also be used to set the desired internal pressure in brake master cylinder 10.

Figure 2H:
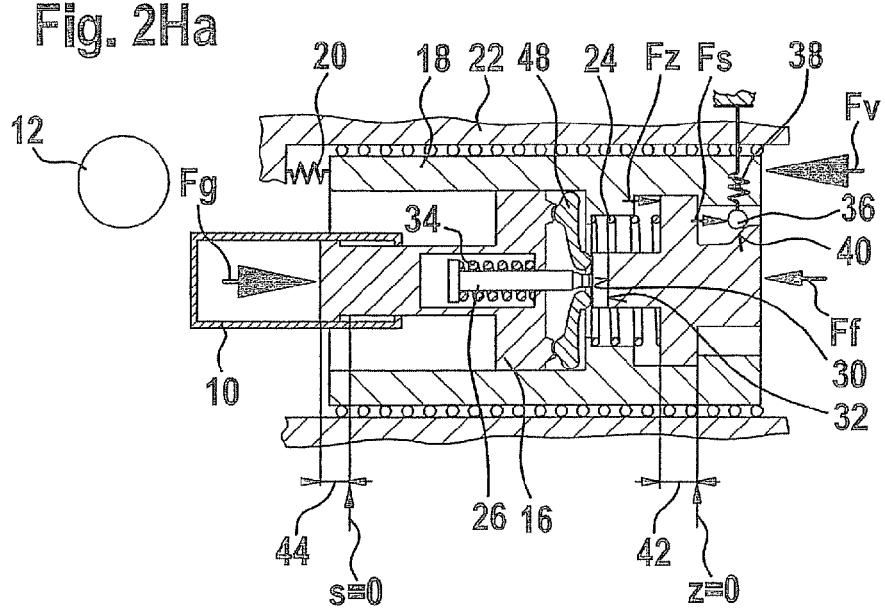
Figure 2H:
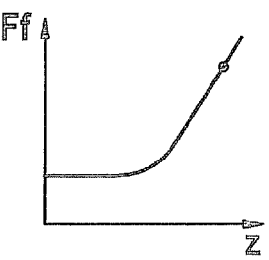
Figure 2H:
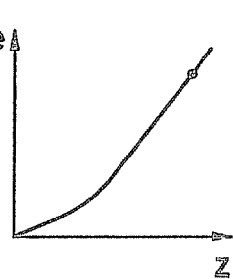
Figure 2H:
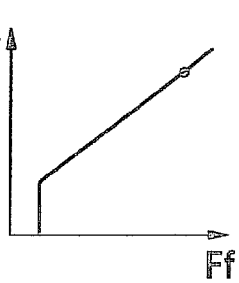

FIG. 2Ha shows the brake booster coupling device in the case of a driver braking distance z equal to a predefined threshold value zs, for example, at a total braking torque of 0.4 g, at which input piston 14 contacts contact element 26. The air gap is closed. Therefore, from a driver braking distance z equal to threshold value zs, a contact exists between input piston 14 and contact element 26, via which driver brake force Ff is transmittable to braking piston 16.

This may also be described in such a way that second contact surface 30 of input piston 14, which is displaced by a driver braking distance z from threshold value zs, contacts first contact surface 32 of contact element 26 in such a way that driver brake force Ff is transmittable by input piston 14, which is displaced by driver braking distance z from threshold value zs, via contact element 26 to braking piston 16, which is present in a position range including the non-braking position and the at least one braking position. In addition to an advantageous standard braking feeling, reliable closing of the air gap is therefore also ensured by touching of contact surfaces 30 and 32 in the case of a specific driver braking distance zs independently of the current degree of recuperation. Due to the touch contact between input piston 14 and contact element 26, the driver has the possibility from driver braking distance z equal to threshold value zs of braking directly into brake master cylinder 10 and therefore rapidly increasing the hydraulic braking torque exerted on the wheels, in order to bring the vehicle to a standstill in a comparatively short time. After the closing of the air gap, operation of generator 12 need no longer occur and the vehicle deceleration is exclusively hydraulically executed.

Using the closing of the air gap, the pedal force partial simulator generates its highest simulator force Fs. If driver braking distance z increases beyond threshold value zs with higher driver brake force Ff, the pedal force partial simulator advantageously reduces its simulator force Fs continuously to 0. For this purpose, path 40 assigned to the at least one roller 36 may be shaped in such a way that roller 36 contacts a stretch of path 40 in the case of a further displacement of input piston 14 beyond threshold value zs, which has a decreasing slope in relation to housing 22 and/or in the direction toward spring 38, which goes to zero. In contrast to a conventional full simulator, the pedal force partial simulator described here therefore does not require actuating energy at high driver brake forces Ff. This is advantageous in particular if the brake booster drive fails and the driver must apply all of the actuating energy.

Figure 3A:
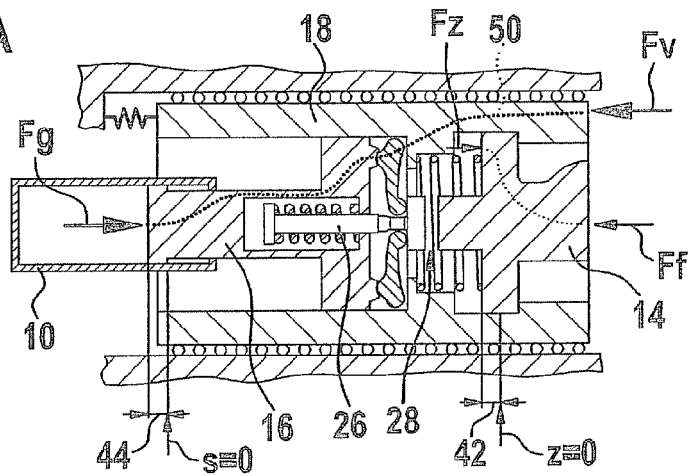
Figure 3B:
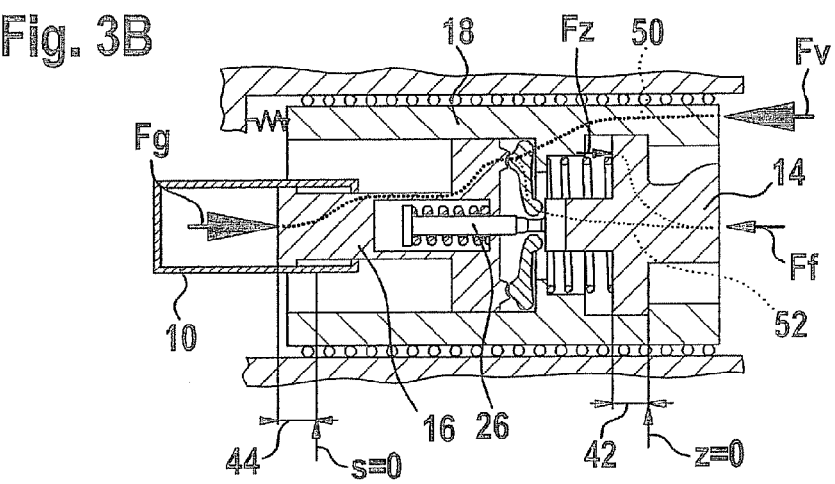
Figure 3C:
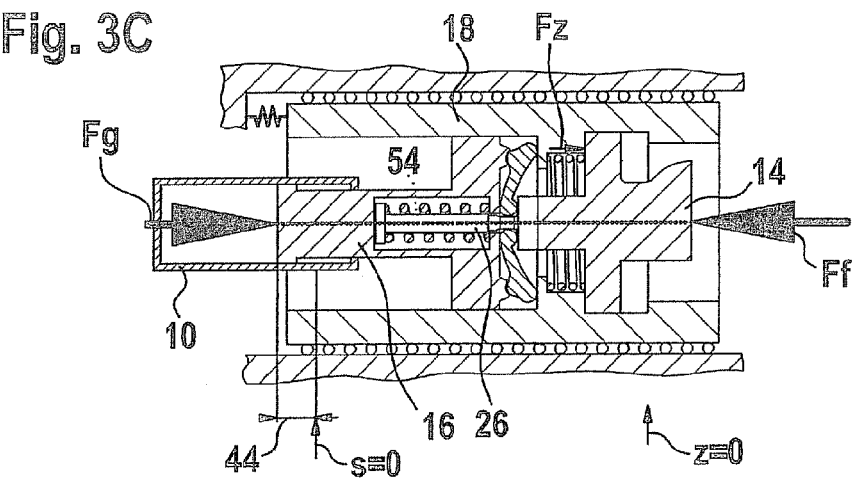

FIGS. 3A through 3C show a force flow in various operating modes of the brake system of FIG. 2.

FIG. 3A shows a first force flow 50 from the brake booster drive (not shown) into brake master cylinder 10 in the operating mode already shown in FIG. 2Ba. The driver therefore has the possibility in jump-in range J of indirectly building up a hydraulic braking torque on the wheels of his vehicle with the aid of the brake booster drive. A force flow for the direct transmission of driver brake force Ff to contact element 26 is prevented because of air gap 28.

FIG. 3B shows that, in addition to first force flow 50 for braking into the brake master cylinder with the aid of booster force Fv, a second force flow 52 is also possible to relay driver brake force Ff to braking piston 16 via contact element 26 in the case of a closed air gap. The driver may thus also brake directly into brake master cylinder 10 with the aid of driver brake force Ff in the operating mode shown in FIG. 2Ha. This relieves the brake booster drive during generation of a high hydraulic braking torque. The brake booster drive may therefore be designed cost-effectively and require less installation space.

A third force flow 54 for transmitting driver brake force Ff to braking piston 16 in the event of a failed brake booster drive is shown in FIG. 3C. The driver must only bridge the relatively small driver braking distance range with the aid of a comparatively low driver brake force Ff via intermediate spring force Fz and the friction in order to be able to brake directly into brake master cylinder 10. Therefore, rapid braking of the vehicle is also executable after a failure of the brake booster drive.

FIGS. 4A through 4E show two cross sections, a coordinate system, and two schematic views to explain a second specific embodiment of the brake booster coupling device.

Figure 4A:
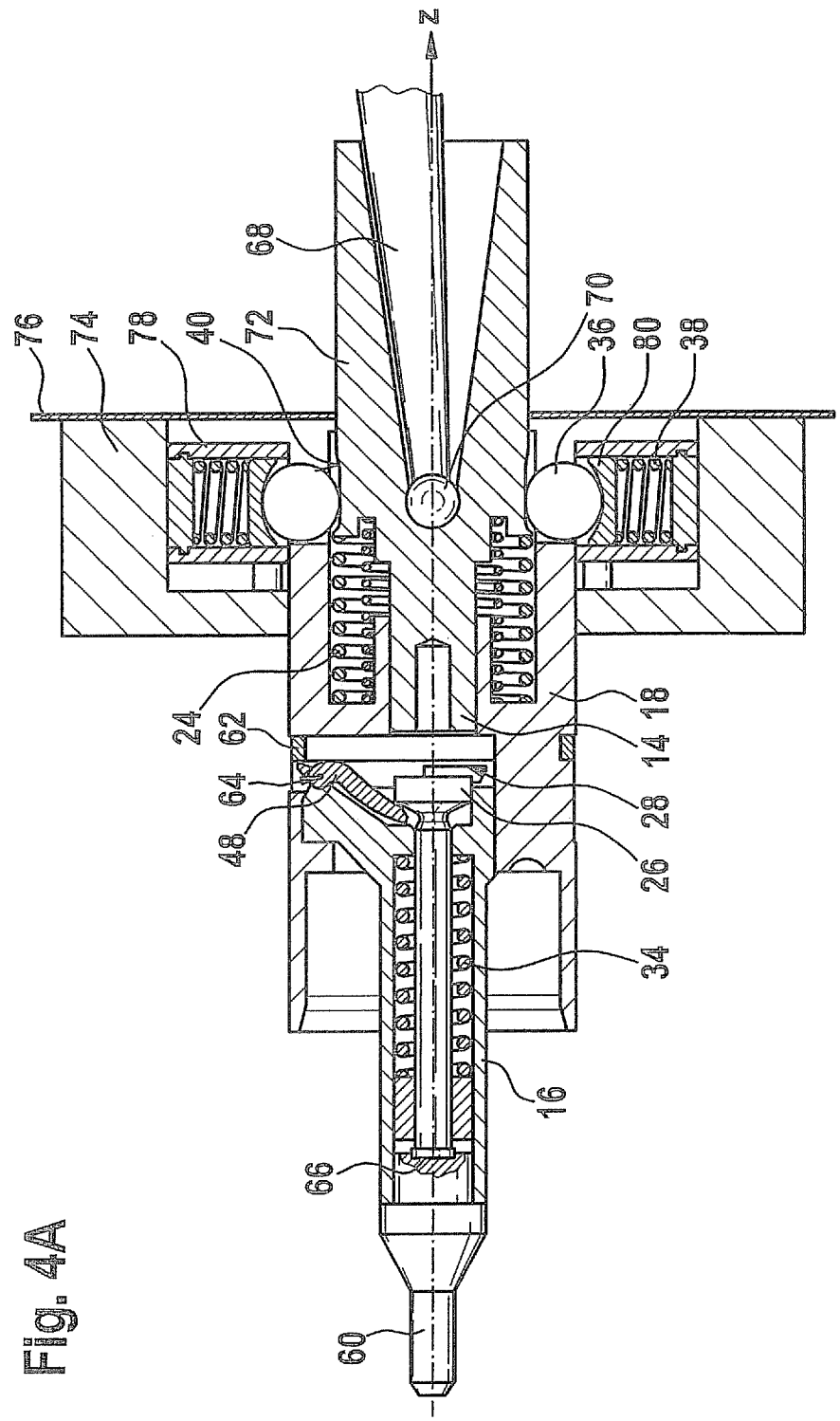

FIG. 4A schematically shows a cross section along the axis of driver braking distance z through the brake booster coupling device. The brake system has an input piston 14, which is designed as a pressure pin, a braking piston 16, which is equipped with a stop rod 60, a booster piston 18, which is equipped with a hardened ring 62, and a contact element 26, which is designed as a tappet having a conical surface, and which is connected to booster piston 18 via a lever 48, which is situated rotatably around a rotational axis 64 with the aid of a friction bearing or a bearing plate. The tappet has a stop 66, which contacts stop rod 60 in a starting position. Reference is made to the above-described specific embodiment with respect to the cooperation of these components.

The input piston, which is designed as a pressure pin, may have a recess into which a ball joint 70 of an input rod 68 protrudes. Ball joint 70 may be situated on an inner contact area of the recess in such a way that input rod 68 may execute a pivot movement within the recess. This ensures a reliable force transmission from a brake input element (not shown) to the input piston.

In this specific embodiment, an outer sleeve 72 of input piston 14 is also shaped in such a way that it has at least one path 40 for a roller (plain roller) 36 of a pedal force partial simulator in each case. Reference is made to the above-described specific embodiment and to FIG. 4C described hereafter with respect to the various sections of path 40.

FIG. 4B shows a cross section through the pedal force partial simulator perpendicularly to the axis of driver braking distance z. In the specific embodiment described here, simulator spring 38, which cooperates with a roller 36, is oriented radially away from roller 36. Each of rollers 36 and simulator springs 38 is situated in a cavity of a housing 74 having a spray wall 76. One roller 36 and simulator spring 38 cooperating therewith may be inserted into a separate hole of a ring housing 78 in each case, which is situated inside the opening in housing 74. These holes may also alternatively be formed directly in housing 74. A pressure part 80 may additionally be situated between a roller 36 and simulator spring 38 cooperating therewith.

As is apparent in FIG. 4B, each of rollers 36 may be situated rotatably around its axis in ring housing 78 with the aid of a pin 82 and a needle roller 84. Pressure part 80 may rotate freely in the hole. Pressure part 80 having roller 36 thus orients itself in relation to input piston 14 having paths 40 according to the exemplary embodiments and/or exemplary methods of the present invention. This may also be paraphrased that a centering action is generated because of the concave contact line of each roller 36 in longitudinal section and outer sleeve 72 in cross section.

In the illustrated specific embodiment, pedal force partial simulator includes two rollers 36 having associated simulator springs 38, which may be situated offset by 180°. The brake system described here is not restricted to a number of two rollers 36, simulator springs 38, and paths 40, however.

For example, the pedal force partial simulator may also have three rollers 36, which are situated offset by 120°. This ensures that rollers 36 and springs 38 do not generate lateral forces.

The mode of operation of the pedal force partial simulator will be explained once again on the basis of the coordinate system of FIG. 4C. The abscissa and the ordinate of the coordinate system of FIG. 4C show driver braking distance z and driver brake force Ff.

To initiate a braking action, the driver must displace input piston 14 out of its starting position via an operation of the brake input element. This is implementable in that the driver exerts a comparatively small driver brake force Ff equal to a minimum force Fm on the brake input element.

During a subsequent jump-in range J, which is perceived by the driver, the driver may only exert this comparatively small driver brake force Ff on his brake input element to increase the total braking torque. In this operating mode, above-described air gap 28 exists between braking piston 14 and contact element 26, so that direct braking of the driver into the brake master cylinder is suppressed. Instead, with the aid of the brake booster drive and/or with the aid of the generator in the above-described way, the total braking torque desired by the driver may be exerted as the generator braking torque and/or hydraulic braking torque on the wheels. Since there is no direct coupling between input piston 14 and brake master cylinder 10 in this operating mode, the driver is not irritated because of a brake operation feeling which changes as a result of the applied braking mode.

It is to be noted once again that during jump-in range J, which is perceptible by the driver, roller 36 running on the at least one path 40 is not moved against simulator spring 38 and therefore no (essential) simulator force Fs is generated. This is implementable, for example, in that the associated section of outer sleeve 72 is designed to be cylindrical, the cylinder length corresponding to perceived jump-in range J.

From a driver braking distance zj, the driver notices an accustomed increase of driver brake force Ff to be applied. This standard increase of the driver brake force from driver braking distance zj is implementable although air gap 28 also exists between input piston 14 and contact element 26 in the operating mode of a driver braking distance z between zj and threshold value zs. For this purpose, simulator force Fs is generated with the aid of the pedal force partial simulator. This is implementable, for example, in that path 40 is shaped for the section which is contacted by roller 36 in the case of a driver braking distance z between zj and threshold value zs in such a way that the rotation of the section of the path around the axis of driver braking distance z is equal to a truncated cone in a first approximation.

The actual (mechanical) decoupling range is therefore greater than jump-in range J, which is perceived by the driver, and which ends upon reaching driver braking distance zj. The actual (mechanical) decoupling range is concealable with the aid of the pedal force partial simulator, in that the pedal force partial simulator generates a maximum value for simulator force Fs outside perceived jump-in range J.

The increased actual (mechanical) decoupling range in relation to perceived jump-in range J may be used for blending a generator braking torque. For example, a generator braking torque of 0.1 g may be blended in the case of a driver braking distance z1 and a generator braking torque of 0.2 g may be blended in the case of a driver braking distance z2. In a specific embodiment, the actual (mechanical) decoupling range may be enlarged enough that a generator braking torque of 0.3 g is blendable in the case of a driver braking distance z3.

After driver braking distance z3, air gap 28 is closed in the case of a driver braking distance z equal to a threshold value zs. As already described above, direct braking of the driver into the brake master cylinder is therefore possible from driver braking distance zs. Simulator force Fs of the pedal force partial simulator therefore may decrease from driver braking distance zs and finally goes to zero. This reduces driver brake force Ff to be applied by the driver in the case of a large driver braking distance z.

The reduction of simulator force Fs from driver braking distance zs is implementable, for example, in that in this section of path 40, outer envelope 72 is shaped as a truncated cone having a decreasing slope, which goes to zero.

In the case of a driver braking distance increase from driver braking distance z having the slope which goes to zero, envelope 72 may be shaped as a cylinder, the cylinder length corresponding to maximum possible driver braking distance z (axial distance) of input piston 14. This ensures that roller 36 runs on the cylinder and no (essential) simulator force Fs is generated.

In summary, a particularly advantageous path 40 is shaped in such a way that roller 36, in the case of a driver braking distance z of input piston 14 between the starting position of input piston 14 and driver braking distance zj, contacts a first section of path 40 having a small slope α (in particular if intermediate spring 24 is omitted to reduce costs and/or installation space), in the case of a driver braking distance z of input piston 14 between driver braking distance zj and threshold value zs, contacts a second section of path 40 having an increasing slope α, and/or in the case of a driver braking distance z of input piston 14 from threshold value zs, contacts a third section of path 40 having a decreasing slope α which goes to zero.

The relationship between a spring force F38 of simulator spring 38, a slope α of path 40 (wedge angle), and simulator force Fs is shown on the basis of FIG. 4D. (Slope α corresponds to a quotient of a change of path 40 perpendicularly to the axis of driver braking distance z through a change of path 40 parallel to the axis of driver braking distance z.) The following equation applies (equation 1):

$$Fs = \tan \alpha \cdot F38, \quad \text{(Equation 1)}$$

spring force F38 rising with increasing displacement of roller 36 perpendicularly to the axis of driver braking distance z. FIG. 4E shows a schematic view to explain the mode of operation of the lever system made of input piston 14 and support piston 18. The lever ratios are given by lever lengths h2a and h1a. In order to ensure advantageous booster behavior of the brake booster drive, the lever ratios may be set accordingly.

For example, the booster ratio of the brake booster drive may have a defined value during operation, this transmission ratio being able to remain constant over the entire operating range. This may also apply if the effective length of the lever arms changes with pivot angle β. The following equation (equation 2) may apply for booster ratio a:

$$a = \frac{h2a}{h1a} = \frac{h2b}{h1b}; \quad \text{(Equation 2)}$$

so that a may remain constant, h2a being a spacing of pivot point 64 of lever 48 and the contact surface of contact element 26 in a neutral position of contact element 26, h1a being a spacing of booster piston 18 (or ring 62) in a neutral position of contact element 26, h2b being a spacing of pivot point 64 of lever 48 and the contact surface of contact element 26 in an end position of contact element 26, and h1b being a spacing of booster piston 18 (or ring 62) in an end position of contact element 26.

As long as pivot point 90 is located on a linear lever 48, transmission ratio a remains constant with the change of pivot angle β. Equation 2 may be ensured in that the contact between lever 48 and contact element 26 and the contact between lever 48 and ring 62 are designed in the form of a tooth engagement, which may correspond to the tooth engagement of a pinion and a toothed rack. Tooth engagements have the advantage that, independently of pivot angle β, the effective length of the lever arms and the effect of the force transmission (engagement angle) remain constant and the friction losses are relatively small.

An engagement angle of 0° which may exists between lever 48 and ring 62. Since the tooth flank of a toothed rack is typically a plane, the counter flank may be designed as a simple, hardened ring 62. This is cost-effective and does not require position-bound installation. The tooth engagement between lever 48 and contact element 26 (tappet) has an engagement angle of 25°, for example. The counter flank is the lateral surface of a cone having the cone angle 25° and therefore is not a plane, but rather a curved surface. This curvature is technically handled like a strongly crowned gearing. Since contact element 26 having the cone is a simple rotating part, it does not require position-bound installation. Overload of the lever is preventable in that contact element 26, which may be configured as a tappet, stops against output rod 60.

Figure 5A:
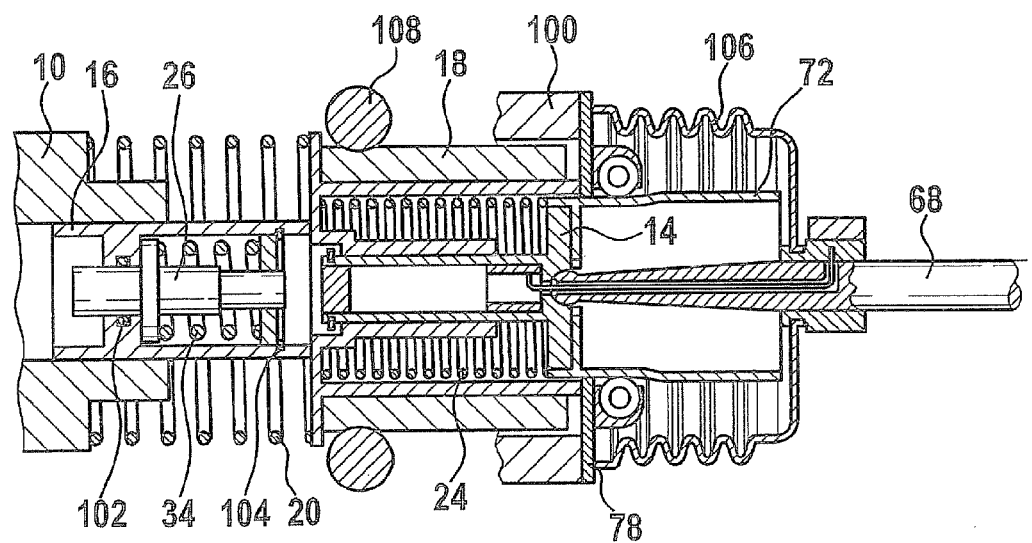
Figure 5B:
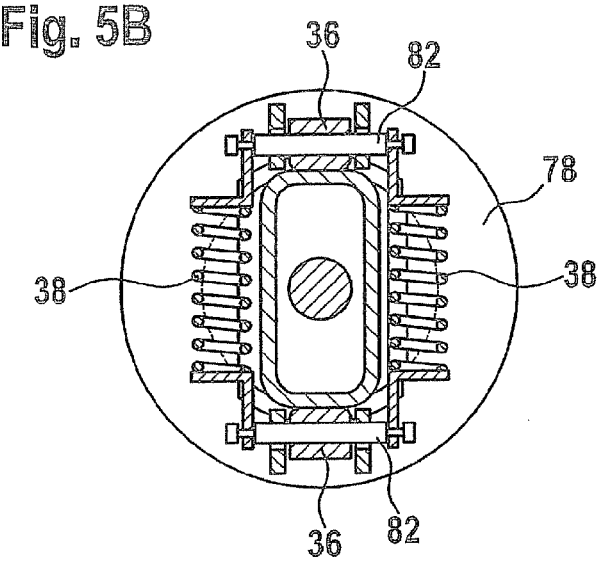

FIGS. 5A and 5B show two cross sections to illustrate a third specific embodiment of the brake booster coupling device.

In the cross section through the brake booster coupling device parallel to the axis of driver braking distance z of FIG. 5A, a partial area of a housing 100 may also be seen. The illustrated brake system additionally includes a sealing ring 102, (optional) a ring 104, and parts of a protective envelope 106 (bellows). A pinion (drive shaft) 108 may also be situated on booster piston 18.

Contact element 26 represents a hydraulic piston. The (right) front side of contact element 26 facing toward the input piston is contact surface 32, the (left) front side facing toward brake master cylinder 10 is effective piston surface xy1. The ratio of ring piston surface xy2 of braking piston 16 to piston surface xy1 determines booster ratio a (similarly to lever ratio a). Otherwise, reference is made to the above-described specific embodiments with respect to the mode of operation of the individual components.

As is apparent on the basis of the cross section through the pedal force partial simulator perpendicularly to the axis of driver braking distance z of FIG. 5B, simulator springs 38 are stretched between two pins 82, which are offset by 180°, of both rollers 36 in the illustrated specific embodiment. A first simulator spring 38 connects a first end of pin 82 of the first roller to an opposing first end of pin 82 of second roller 36. Correspondingly, second simulator spring 38 connects the second end of pin 82 of first roller 36 to the second end of pin 82 of second roller 36.

In this specific embodiment, holes do not have to be formed in ring housing 78 for simulator springs 38. In addition, simulator springs 38 in a larger and more robust design are usable. This reduces the manufacturing costs for the pedal force partial simulator and increases its service life.

Figure 6A:
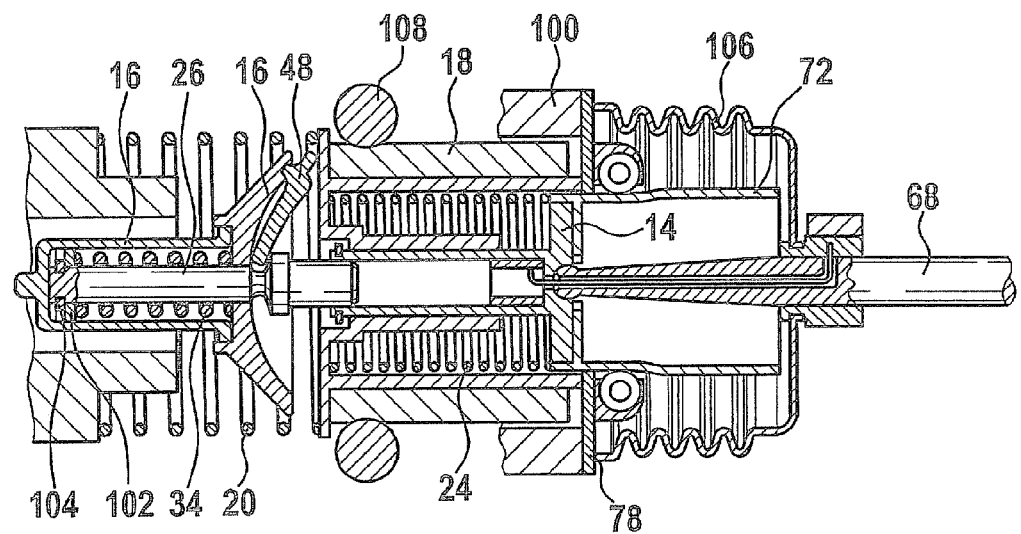
Figure 6B:
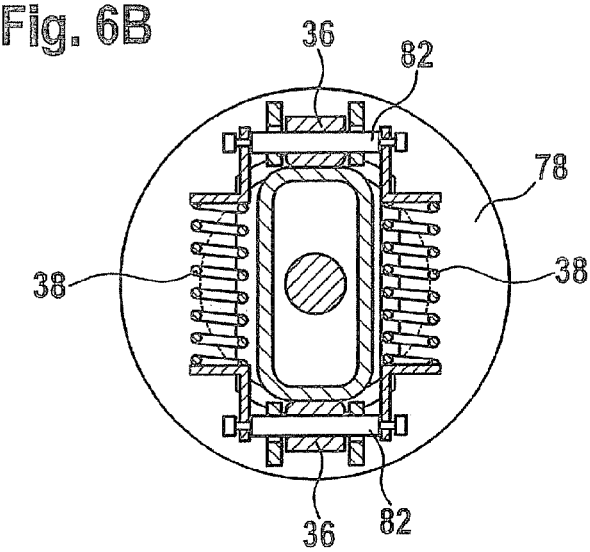

FIGS. 6A and 6B show two cross sections to illustrate a fourth specific embodiment of the brake booster coupling device.

The brake system which is schematically shown in FIGS. 6A and 6B via a cross section through the brake booster coupling device parallel to the axis of driver braking distance z and via a cross section through the pedal force partial simulator perpendicularly to the axis of driver braking distance z ensures the above-described advantages. A further listing of these advantages will be dispensed with here.

Figure 7A:
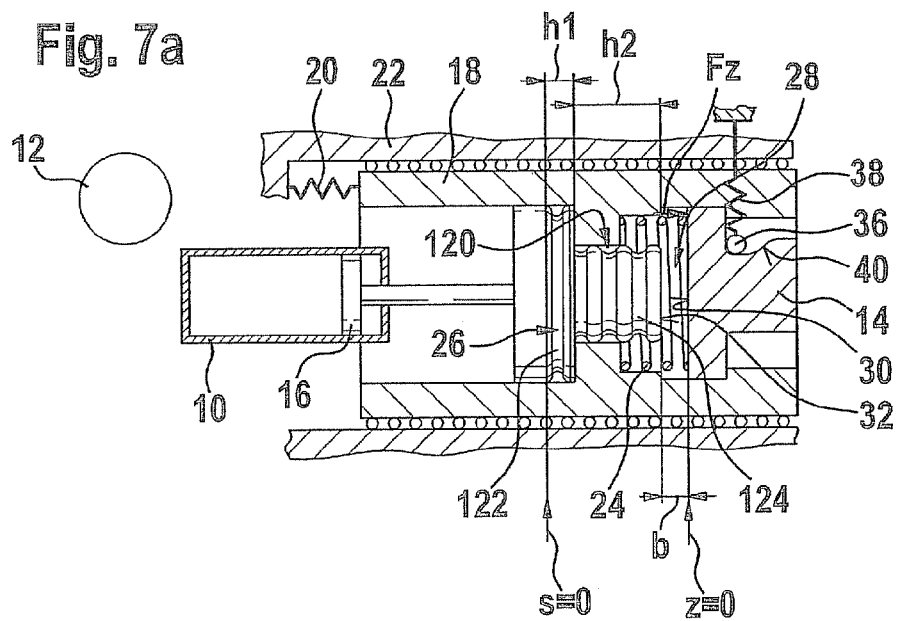
Figure 7B:
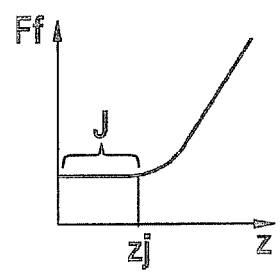
Figure 7C:
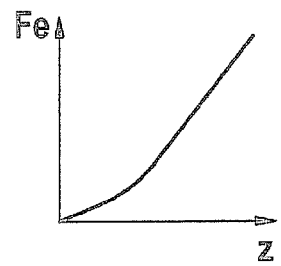
Figure 7D:
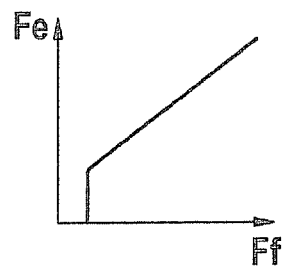

FIGS. 7a through 7d show a schematic illustration and three coordinate systems to illustrate a fifth specific embodiment of the brake booster coupling device. The abscissa of the coordinate systems of FIGS. 7b and 7c is driver braking distance z. The ordinate of the coordinate system of FIG. 7b and the abscissa of the coordinate system of FIG. 7d is driver brake force Ff. Correspondingly, the ordinate of the coordinate systems of FIGS. 7c and 7d is braking force Fe.

In the brake booster coupling device which is schematically shown in FIG. 7a, contact element 26 is designed as a bellows, which may have a liquid filling. Contact element 26 may be a metal bellows, for example. In particular, a spring may be inserted into the bellows.

Booster piston 18 has an inner ring attachment 120, on which contact element 26 is situated. A first part 122 of contact element 26 having a greater first diameter perpendicularly to the axis of driver braking distance z is situated between inner ring attachment 120 and braking piston 16. A second part 124 of contact element 26 having a smaller second diameter perpendicularly to the axis of driver braking distance z is at least partially situated inside an inner recess of inner ring attachment 120 and is oriented away from braking piston 16 in relation to first part 122.

Since the inner volume of contact element 26 also remains constant in the case of a displacement of braking piston 16, a reduction of a first height h1 of first part 122 parallel to the axis of driver braking distance z, which is associated with a displacement movement of the booster piston in the direction toward brake master cylinder 10, causes an increase of a second height h2 of second part 124, which runs parallel to the longitudinal axis of driver braking distance z, in such a way that sum h1+h2 increases. Therefore, a displacement movement of booster piston 18 in the direction toward the brake master cylinder is also associated with a reduction of air gap 28 between contact surfaces 30 and 32. The brake system described here therefore ensures the above-described advantages. Furthermore, contact element 26, which is designed as a bellows, ensures that in contrast to a disc (reaction disc), greater air gaps (strokes) are bridgeable.

It is to be noted that the brake booster coupling device shown using the described figures is not restricted to an application in a brake system having a specific maximum possible degree of recuperation. The brake booster coupling device may also be designed in such a way that because of the starting width of air gap 28, at most a generator braking torque of 0.2 g or 0.1 g is blendable. In particular, in this case the actual (mechanical) decoupling range and jump-in range J which is perceived by the driver may be identical. Such a specific embodiment is implementable with little outlay, a pedal force partial simulator being able to be dispensed with. This reduces the costs and/or increases the compactness of the brake system.

In particular, in the case of a maximum blendable generator brake torque of 0.05 g, a rubber disc (reaction disc) may also be used as contact element 26. The maximum blendable generator braking torque may be increased in that the air gap between the rubber disc and input piston 14 is expanded slightly. Jump-in range J may particularly be selected in such a way that the rubber disc is not mechanically overloaded.

The exemplary embodiments and/or exemplary methods of the present invention therefore ensure a brake booster coupling device for a brake system having a maximum blendable generator braking torque, which is freely selectable in a range between 0.05 g and 0.4 g. Independently of the selected maximum blendable generator braking torque/degree of recuperation, a good blending capability is also ensured in the event of a decoupling of the input piston outside (desired) jump-in range J perceived by the driver.

What is claimed is:

1. A brake booster coupling device, comprising:
   a braking piston, which is at least partially displaceable in a brake master cylinder;
   an input piston, which is situatable on a brake input element so that the input piston is displaceable in the event of an operation of the brake input element from its starting position by a driver braking distance in a direction toward at least one of the braking piston and the brake master cylinder, wherein a force transmission between the input piston, which is displaced by a driver braking distance below a predefined threshold value, and the braking piston is prevented;
   a booster piston, which is situatable on a brake booster drive so that the booster piston is displaceable with the aid of the brake booster drive, at least in the case of a driver braking distance of the input piston below the predefined threshold value, so that the braking piston, which contacts the booster piston, is displaceable with the aid of the brake booster drive from a non-braking position into at least one braking position; and
   a contact element, which is situated on the braking piston, and which is at least one of displaced and deformed in the event of a displacement of the braking piston from the non-braking position into the at least one braking position so that a first contact surface of the contact element is transferred in relation to the braking piston in a direction toward a second contact surface of the input piston, the second contact surface of the input piston, which is displaced by a driver braking distance greater than the threshold value, contacts the first contact surface of the contact element so that a driver brake force is transmitted from the input piston, which is displaced by the driver braking distance greater than the threshold value, via the contact element to the braking piston, which is present in a position range including the non-braking position and the at least one braking position.

2. The brake booster coupling device of claim 1, wherein a spacing between the first contact surface and the second contact surface is a function of the driver braking distance.

3. The brake booster coupling device of claim 1, wherein the spacing between the first contact surface and the second contact surface is independent of a relative distance of the input piston in relation to the booster piston.

4. The brake booster coupling device of claim 1, wherein the brake booster coupling device includes said brake booster drive, which, at least in the case of a driver braking distance of the input piston below the predefined threshold value, is operable in a non-recuperation mode having a degree of recuperation equal to zero and in at least one recuperation mode having a degree of recuperation not equal to zero.

5. The brake booster coupling device of claim 4, wherein the spacing between the first contact surface and the second contact surface is independent of a current degree of recuperation.

6. The brake booster coupling device of claim 1, wherein the brake booster coupling device includes a pedal force partial simulator, which exerts a small constant simulator force in the case of a driver braking distance of the input piston between the starting position of the input piston and a limiting driver braking distance, and exerts a continuously increasing simulator force on the input piston in the case of a driver braking distance of the input piston between the limiting driver braking distance and the threshold value.

7. The brake booster coupling device of claim 6, wherein the pedal force partial simulator exerts a continuously decreasing simulator force, which goes to zero, on the input piston in the case of a driver braking distance of the input piston from the threshold value.

8. The brake booster coupling device of claim 6, wherein the pedal force partial simulator includes at least one roller, which is connected via a simulator spring to a housing, and which is guided along a path on the input piston during a displacement of the input piston from the starting position by the driver braking distance.

9. The brake booster coupling device of claim 8, wherein a slope is definable as a quotient of a change of the path perpendicularly to an axis of the driver braking distance by a change of the path parallel to the axis of the driver braking distance, and the roller contacting a first section of the path having a small slope in the case of a driver braking distance of the input piston between the starting position of the input piston and the limiting driver braking distance, contacting a second section of the path having an increasing slope in the case of a driver braking distance of the input piston between the limiting driver braking distance and the threshold value, and/or contacting a third section of the path having a decreasing slope, which goes to zero, in the case of a driver braking distance of the input piston from the threshold value.

10. The brake booster coupling device of claim 1, wherein the contact element includes a tappet which is displaceable in relation to the braking piston.

11. A regenerative brake system, comprising:
a brake booster coupling device, including:
   a braking piston, which is at least partially displaceable in a brake master cylinder;
   an input piston, which is situatable on a brake input element so that the input piston is displaceable in the event of an operation of the brake input element from its starting position by a driver braking distance in a direction toward at least one of the braking piston and the brake master cylinder, wherein a force transmission between the input piston, which is displaced by a driver braking distance below a predefined threshold value, and the braking piston is prevented;
   a booster piston, which is situatable on a brake booster drive so that the booster piston is displaceable with the aid of the brake booster drive, at least in the case of a driver braking distance of the input piston below the predefined threshold value, so that the braking piston, which contacts the booster piston, is displaceable with the aid of the brake booster drive from a non-braking position into at least one braking position; and
   a contact element, which is situated on the braking piston, and which is at least one of displaced and deformed in the event of a displacement of the braking piston from the non-braking position into the at least one braking position so that a first contact surface of the contact element is transferred in relation to the braking piston in a direction toward a second contact surface of the input piston, the second contact surface of the input piston, which is displaced by a driver braking distance greater than the threshold value, contacts the first contact surface of the contact element so that a driver brake force is transmitted from the input piston, which is displaced by the driver braking distance greater than the threshold value, via the contact element to the braking piston, which is present in a position range including the non-braking position and the at least one braking position; and
a generator.

12. The regenerative brake system of claim 11, wherein the regenerative brake system includes a brake input element, and the input piston is displaceable with the aid of a small constant driver brake force on the brake input element from its starting position by a driver braking distance up to a limiting driver braking distance below the threshold value.

13. The regenerative brake system of claim 12, wherein an increasing simulator force counteracts a further displacement of the input piston with the aid of the driver brake force on the brake input element on a driver braking distance between the limiting driver braking distance and the threshold value.

14. A vehicle, comprising:
a brake booster coupling device, including:
   a braking piston, which is at least partially displaceable in a brake master cylinder;
   an input piston, which is situatable on a brake input element so that the input piston is displaceable in the event of an operation of the brake input element from its starting position by a driver braking distance in a direction toward at least one of the braking piston and the brake master cylinder, wherein a force transmission between the input piston, which is displaced by a driver braking distance below a predefined threshold value, and the braking piston is prevented;
   a booster piston, which is situatable on a brake booster drive so that the booster piston is displaceable with the aid of the brake booster drive, at least in the case of a driver braking distance of the input piston below the predefined threshold value, so that the braking piston, which contacts the booster piston, is displaceable with the aid of the brake booster drive from a non-braking position into at least one braking position; and
   a contact element, which is situated on the braking piston, and which is at least one of displaced and deformed in the event of a displacement of the braking piston from the non-braking position into the at least one braking position so that a first contact surface of the contact element is transferred in relation to the braking piston in a direction toward a second contact surface of the input piston, the second contact surface of the input piston, which is displaced by a driver braking distance greater than the threshold value, contacts the first contact surface of the contact element so that a driver brake force is transmitted from the input piston, which is displaced by the driver braking distance greater than the threshold value, via the contact element to the braking piston, which is present in a position range including the non-braking position and the at least one braking position.

15. A vehicle, comprising:
a regenerative brake system, including:
a brake booster coupling device, including:
  a braking piston, which is at least partially displaceable in a brake master cylinder;
  an input piston, which is situatable on a brake input element so that the input piston is displaceable in the event of an operation of the brake input element from its starting position by a driver braking distance in a direction toward at least one of the braking piston and the brake master cylinder, wherein a force transmission between the input piston, which is displaced by a driver braking distance below a predefined threshold value, and the braking piston is prevented;
  a booster piston, which is situatable on a brake booster drive so that the booster piston is displaceable with the aid of the brake booster drive, at least in the case of a driver braking distance of the input piston below the predefined threshold value, so that the braking piston, which contacts the booster piston, is displaceable with the aid of the brake booster drive from a non-braking position into at least one braking position; and
  a contact element, which is situated on the braking piston, and which is at least one of displaced and deformed in the event of a displacement of the braking piston from the non-braking position into the at least one braking position so that a first contact surface of the contact element is transferred in relation to the braking piston in a direction toward a second contact surface of the input piston, the second contact surface of the input piston, which is displaced by a driver braking distance greater than the threshold value, contacts the first contact surface of the contact element so that a driver brake force is transmitted from the input piston, which is displaced by the driver braking distance greater than the threshold value, via the contact element to the braking piston, which is present in a position range including the non-braking position and the at least one braking position; and
a generator.

16. The brake booster coupling device of claim 8, wherein the contact element includes a hydraulic piston which is displaceable in relation to the braking piston.

17. The brake booster coupling device of claim 16, wherein the hydraulic piston includes a sealing ring.

18. The brake booster coupling device of claim 17, wherein the input piston includes an outer sleeve.

19. The brake booster coupling device of claim 18, wherein the outer sleeve includes a protective envelope.

* * * * *